(12) United States Patent
Coronado et al.

(10) Patent No.: US 9,654,497 B2
(45) Date of Patent: May 16, 2017

(54) VIRUS-RELEASE-DATE-BASED PRIORITY VIRUS SCANNING

(71) Applicant: International Business Machines Corporation, Armonk, NY (US)

(72) Inventors: Juan A. Coronado, Tucson, AZ (US);
Sara M. Coronado, Tucson, AZ (US);
Christina A. Lara, Tucson, AZ (US);
Lisa R. Martinez, Escondido, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/678,956

(22) Filed: Apr. 4, 2015

(65) Prior Publication Data

US 2016/0294847 A1 Oct. 6, 2016

(51) Int. Cl.
*H04L 29/00* (2006.01)
*H04L 29/06* (2006.01)
*G06F 17/30* (2006.01)
*H04L 29/08* (2006.01)

(52) U.S. Cl.
CPC ...... *H04L 63/145* (2013.01); *G06F 17/30345* (2013.01); *H04L 63/1433* (2013.01); *H04L 67/10* (2013.01)

(58) Field of Classification Search
CPC ...... G06F 21/565; G06F 21/564; G06F 21/80; G06F 21/56; H04L 29/06911; H04L 29/06918; H04L 29/06877
See application file for complete search history.

(56) References Cited

U.S. PATENT DOCUMENTS

| | | | | |
|---|---|---|---|---|
| 6,973,578 B1 * | 12/2005 | McIchionc | ............ | G06F 21/563 713/188 |
| 7,581,250 B2 | 8/2009 | Sitze | | |
| 8,650,650 B1 * | 2/2014 | Pavlyushchik | ....... | G06F 21/562 726/22 |
| 8,776,235 B2 | 7/2014 | Coronado et al. | | |
| 2006/0021032 A1 | 1/2006 | Challener et al. | | |
| 2012/0159631 A1 * | 6/2012 | Niemela | ............... | G06F 21/565 726/24 |
| 2013/0060890 A1 * | 3/2013 | Lee | ..................... | G06F 11/1464 709/217 |
| 2014/0059687 A1 | 2/2014 | Coronado et al. | | |

* cited by examiner

*Primary Examiner* — Brandon Hoffman
*Assistant Examiner* — Helai Salehi
(74) *Attorney, Agent, or Firm* — Nelson and Nelson; Daniel P. Nelson; Alexis V. Nelson (57) ABSTRACT

A method for more efficiently scanning files for viruses includes determining a vulnerability date associated with a virus, wherein the vulnerability date is related to a release date of the virus. In certain embodiments, the vulnerability date is a user-tunable amount of time before or after the release date. The method further determines, on a storage system, which files that have been updated since the vulnerability date. These files are scanned for the virus in a first batch. The method further determines which files have not been updated since the vulnerability date. These files are scanned for the virus in a second batch. Because files in the first batch have been updated since the vulnerability date, scanning the first batch may be given priority over scanning the second batch. A corresponding system and computer program product are also disclosed.

14 Claims, 7 Drawing Sheets

VIRUS-RELEASE-DATE-BASED PRIORITY VIRUS SCANNING

BACKGROUND

Field of the Invention

This invention relates to systems and methods for more efficiently scanning data for viruses.

Background of the Invention

Scanning for viruses is routinely performed on data stores to protect data and prevent system damage or corruption. With some storage systems, an antivirus program is executed on a server or machine that operates external to the storage systems. For example, a dedicated server running antivirus software may be configured to scan for viruses on a network attached storage (NAS) device or other storage device that is separate from the server. Given the large amounts of data that can be stored on modern-day storage systems, such as NAS devices, scanning for viruses can be very time consuming. The amount of time required to complete a scan may vary based on considerations such as bandwidth available between the external antivirus server and the storage system. In certain cases, the external antivirus server may be simultaneously scanning data on several storage systems, further increasing the amount of time needed to complete a scan.

While a scan is in process, the I/O performance of the storage system being scanned may be negatively affected. For example, during the scanning process, the antivirus software may lock files residing on the storage system. Thus, the scanning process may reduce the availability of data while it is being scanned. Any delays experienced during the virus scanning process may further reduce availability. The scanning itself may also be performed inefficiently in some cases. For example, files may be scanned that are not vulnerable to viruses or have a low probability of being vulnerable to viruses. In other cases, antivirus software may scan entire files even though only certain parts of the files may be vulnerable to viruses. This can be particularly time-consuming and inefficient with large files such as medical images or videos.

In view of the foregoing, what are needed are systems and methods to more efficiently scan data for viruses, particularly on storage systems such as modern-day NAS systems. Ideally, such systems and methods will improve data availability and more effectively focus virus scanning resources on those files or parts of files that are vulnerable to viruses or potentially vulnerable to viruses.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently scan data for viruses. The features and advantages of the invention will become more fully apparent from the following description and appended claims, or may be learned by practice of the invention as set forth hereinafter.

Consistent with the foregoing, a method for more efficiently scanning files for viruses is disclosed. In one embodiment, such a method includes determining a vulnerability date associated with a virus. The vulnerability date is related to a release date of the virus. In certain embodiments, the vulnerability date is a user-tunable amount of time before or after the release date. The method further determines, on a storage system, which files that have been updated since the vulnerability date. These files are scanned for the virus in a first batch. The method further determines which files have not been updated since the vulnerability date. In certain embodiments, these may be files that were not scanned in the first batch. These files are scanned for the virus in a second batch. Because files in the first batch have been updated since the vulnerability date, scanning the first batch may be given priority over scanning the second batch.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
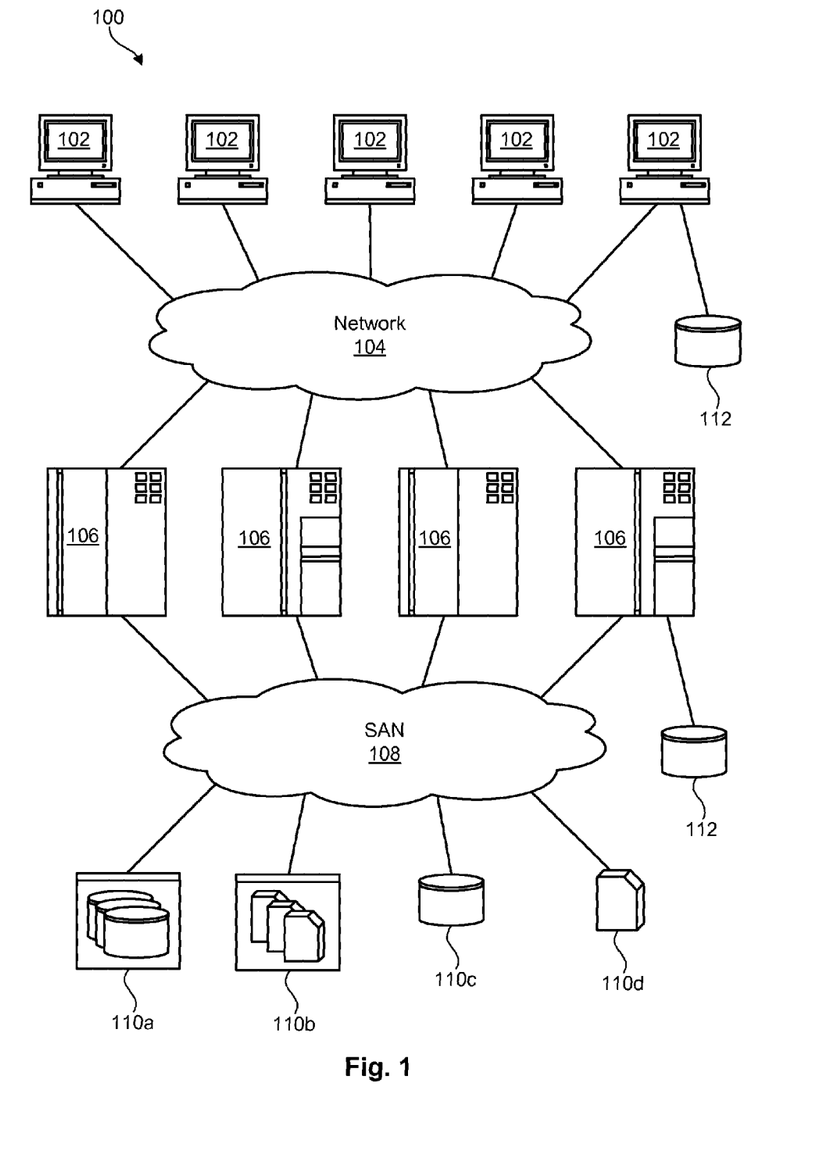
FIG. 1 is a high-level block diagram showing one example of a network environment where a system and method in accordance with the invention may be implemented.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI. In certain embodiments, a host system 106 or other server may function as an antivirus server 106 for scanning data on storage systems 110, 112 connected to the networks 104, 108.

Figure 2:
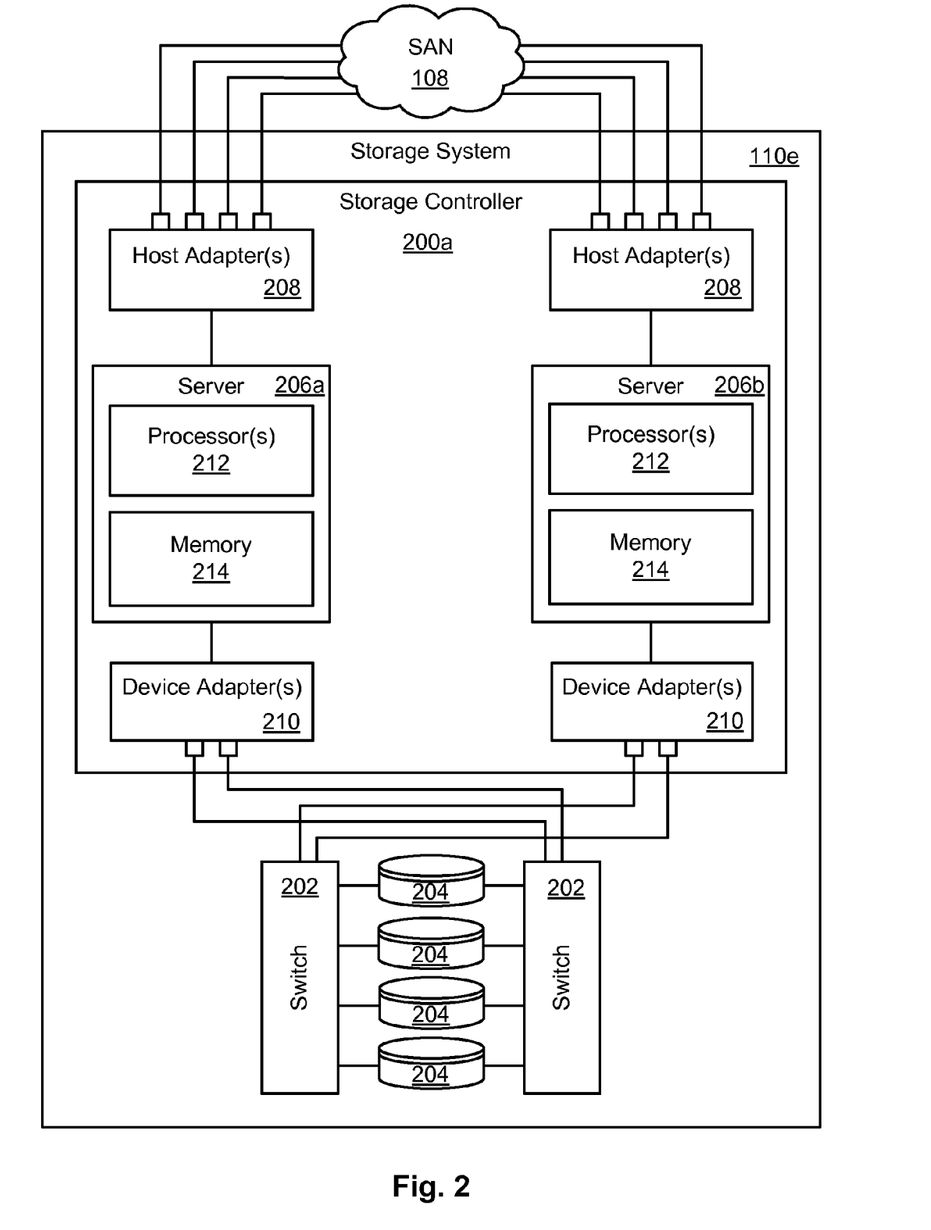
FIG. 2 is a high-level block diagram showing a first example of a storage system where a system and method in accordance with the invention may be implemented.

Referring to FIG. 2, one embodiment of a storage system 110e containing an array of storage drives 204 (e.g., hard-disk drives and/or solid-state drives) is illustrated. The internal components of the storage system 110e are shown since the systems and methods disclosed herein may, in certain embodiments, be implemented within such a storage system 110e, although the systems and methods may also be applicable to other storage systems or groups of storage systems. As shown, the storage system 110e includes a storage controller 200a, one or more switches 202, and one or more storage drives 204 such as hard disk drives and/or solid-state drives (such as flash-memory-based drives). The storage controller 200a may enable one or more hosts 106 (e.g., open system and/or mainframe servers 106) to access data in the one or more storage drives 204.

In selected embodiments, the storage controller 200a includes one or more servers 206. The storage controller 200a may also include host adapters 208 and device adapters 210 to connect the storage controller 200a to host devices 106 and storage drives 204, respectively. Multiple servers 206a, 206b provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, disk drives, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110e having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
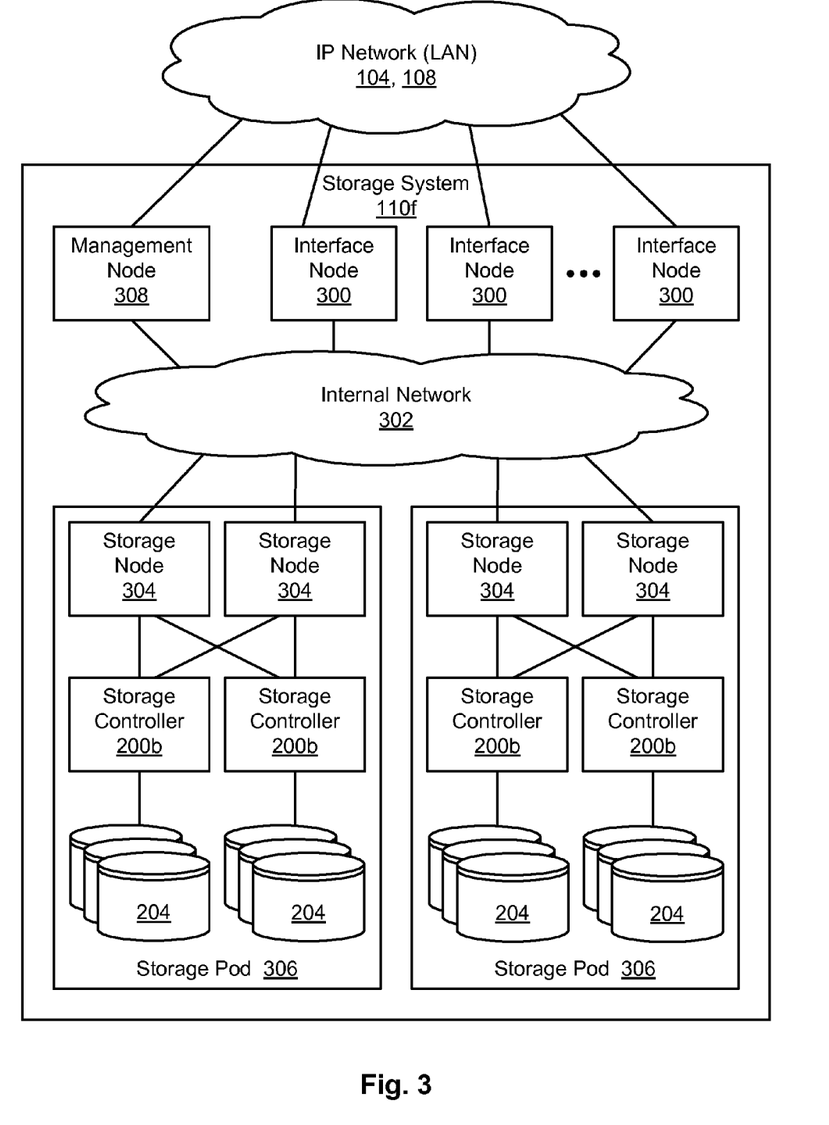
FIG. 3 is a high-level block diagram showing a second example of a storage system where a system and method in accordance with the invention may be implemented.

Referring to FIG. 3, another embodiment of a storage system 110f is illustrated. In the illustrated embodiment, the storage system 110f is a network-attached storage system. IBM's Scale Out Network Attached Storage (SONAS) has an architecture similar to the illustrated storage system 110f.

In certain embodiments, systems and methods in accordance with the invention may be implemented within such a storage system 110f. Nevertheless, the storage system 110f is not limited to the IBM SONAS system but may include any other analogous or similar network-attached storage system 110f. The illustrated network-attached storage system 110f is simply provided by way of example and not limitation.

In certain embodiments, the network-attached storage system 110f may be configured to utilize Ethernet IP network technology associated with conventional LANs. Data may be sent to and from the network-attached storage system 110f over the LAN 104, 108 using the TCP/IP protocol. The network-attached storage system 110f may differ from direct attached storage (DAS) systems 112 or other network storage solutions such as SAN or iSCSI in that client I/O operations to the network-attached storage system 110f may use file level I/O protocols. File I/O may be used to specify a file to be accessed as opposed to directly addressing locations of data on the storage system 110f. The network-attached storage system 110f may receive the file I/O requests and translate these requests into direct addresses for accessing data on the underlying storage media.

As shown, the network-attached storage system 110f includes one or more interface nodes 300 to facilitate communication with the IP network 104, 108. The interface nodes 300 may provide file services to external application machines 106 running standard file access protocols such as NFS of CIFS. Performance and bandwidth scalability may be achieved by adding and removing interface nodes 300 from the network-attached storage system 110f. Each interface node 300 may include at least one processor and may have access to all files on the network-attached storage system 110f. The interface nodes 300 may be configured to balance loads dynamically and provide parallel performance to users accessing the network-attached storage system 110f.

Storage nodes 304 may be configured in high-availability pairs that are connected to one or more storage controllers 200b. The storage controllers 200b may, in turn, provide access to data on one or more storage drives 204. The storage nodes 304 may provide gateways to the storage controllers 200b and associated storage drives 204. In certain embodiments, a storage pod 306 may be made up of a pair of storage nodes 304, one or more storage controllers 200b, and one or more storage drives 204. In certain embodiments, all interface nodes 300 may access all storage on all storage nodes 304. Similarly, all storage nodes 304 may send data to any interface node 300.

In certain embodiments, a management node 308 may provide a central point for a system administrator to configure, monitor, and manage operations of the network-attached storage system 110f. The management node 308 may, in certain embodiments, support a graphical user interface (GUI) and/or a command line interface (CLI). The management node 308 may also, in certain embodiments, monitor overall health of the network-attached storage system 110f. The interface nodes 300, management node 308, and storage nodes 304 may be connected through a scalable, redundant internal network 302 or fabric 302 that allows data to be transferred between the interface nodes 300 and storage nodes 304 and thereby enable access to the storage drives 204.

Figure 4:
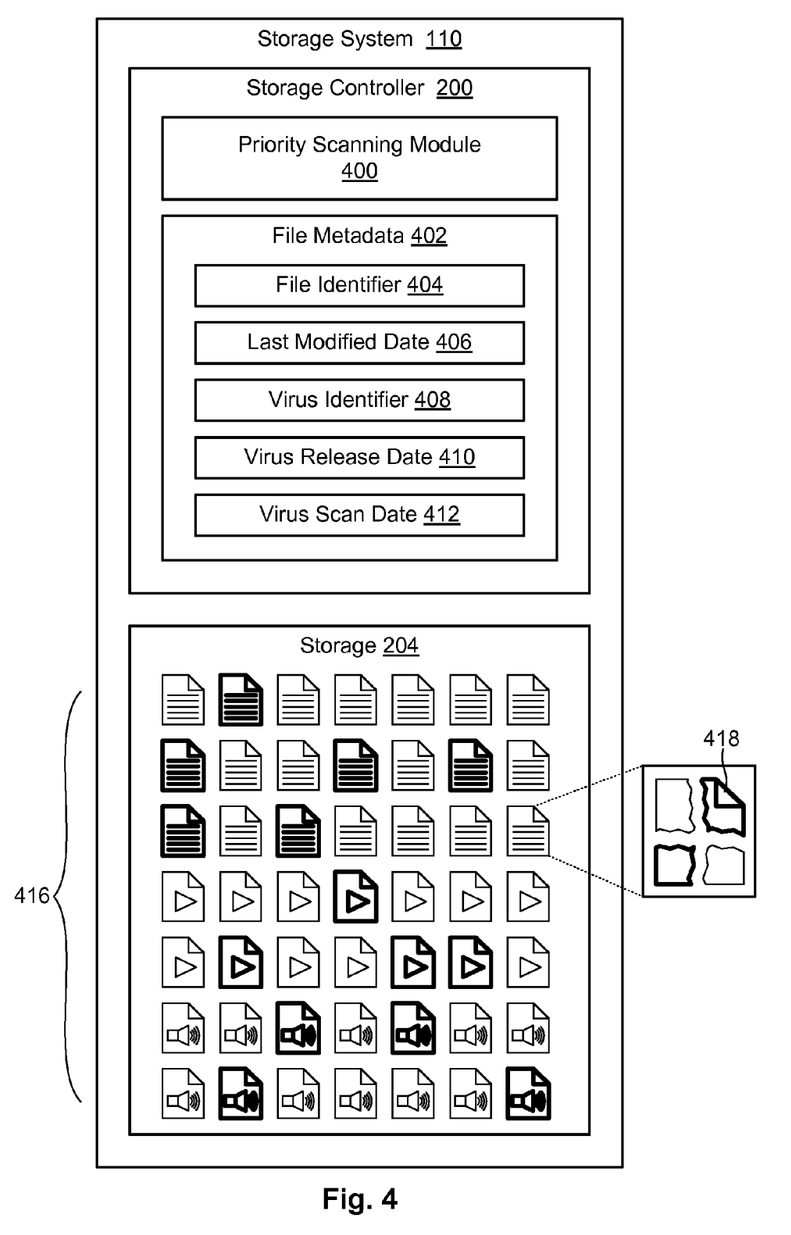
FIG. 4 is a high-level block diagram showing operation of a priority scanning module in accordance with the invention.

Referring to FIG. 4, in certain embodiments in accordance with the invention, a storage system 110 and more particularly a storage controller 200 may be configured with a priority scanning module 400 to assist in more efficiently scanning data on the storage system 110 for viruses. Various internal sub-modules within the priority scanning module 400 will be discussed in association with FIG. 6. In general, instead of just performing a bulk scan of all files 416 on a storage system 110, the priority scanning module 400 may be configured to cause particular files 416 to be scanned for viruses based on a virus "release date." What constitutes a "release date" for a virus may vary in different embodiments. In certain embodiments, the release date is a date (i.e., day, month, year, time, etc.) that a virus definition is updated or released in association with an antivirus software product. In other embodiments, the release date is a date that a virus has generally or publically become known or discovered, such as on the Internet. In other embodiments, the release date is a date listed or published by a security company or organization. Other possibilities exist and are within the scope of the invention.

When a virus "release date" is known, the priority scanning module 400 may be configured to determine a "vulnerability date" associated with the virus. For the purposes of this disclosure, the vulnerability date is a date whereby files 416 that were updated after the vulnerability date are deemed to be vulnerable to the virus, whereas files 416 updated prior to the vulnerability date are deemed not to be vulnerable to the virus. In certain embodiments, the vulnerability date is the same as the virus "release date" previously described. In other embodiments, the vulnerability date is a specified amount of time prior to or after the release date. For example, to ensure files 416 are not infected with a virus, best practice may be to scan files 416 for a virus that have been updated since five days before the virus release date. Using such an example, the vulnerability date of the virus would be five days before the release date of the virus. In certain embodiments, the vulnerability date is a user-tunable amount of time prior to or after the release date.

To enable the priority scanning module 400 to determine which files 416 were updated after a specified vulnerability date, metadata 402 may be maintained for files 416 on the storage system 110. In certain embodiments, the metadata 402 may be maintained specifically for the priority scanning module 400, although the priority scanning module 400 may also be configured to utilize already existing metadata or metadata 402 shared with other functionality. In certain embodiments, metadata 402 may be maintained for each file in the storage system 110. This metadata 402 may include, among other information, a file identifier 404 and a last modified date 406 for each file in the storage system 110. Additionally, the metadata 402 may document when files 416 were scanned for particular viruses. For example, the metadata 402 for a file may include a virus identifier 408 and a virus release date 410 associated with a virus for which the file has been scanned. The metadata 402 may also, in certain embodiments, include a date 412 when the file was scanned for the virus.

Figure 5:
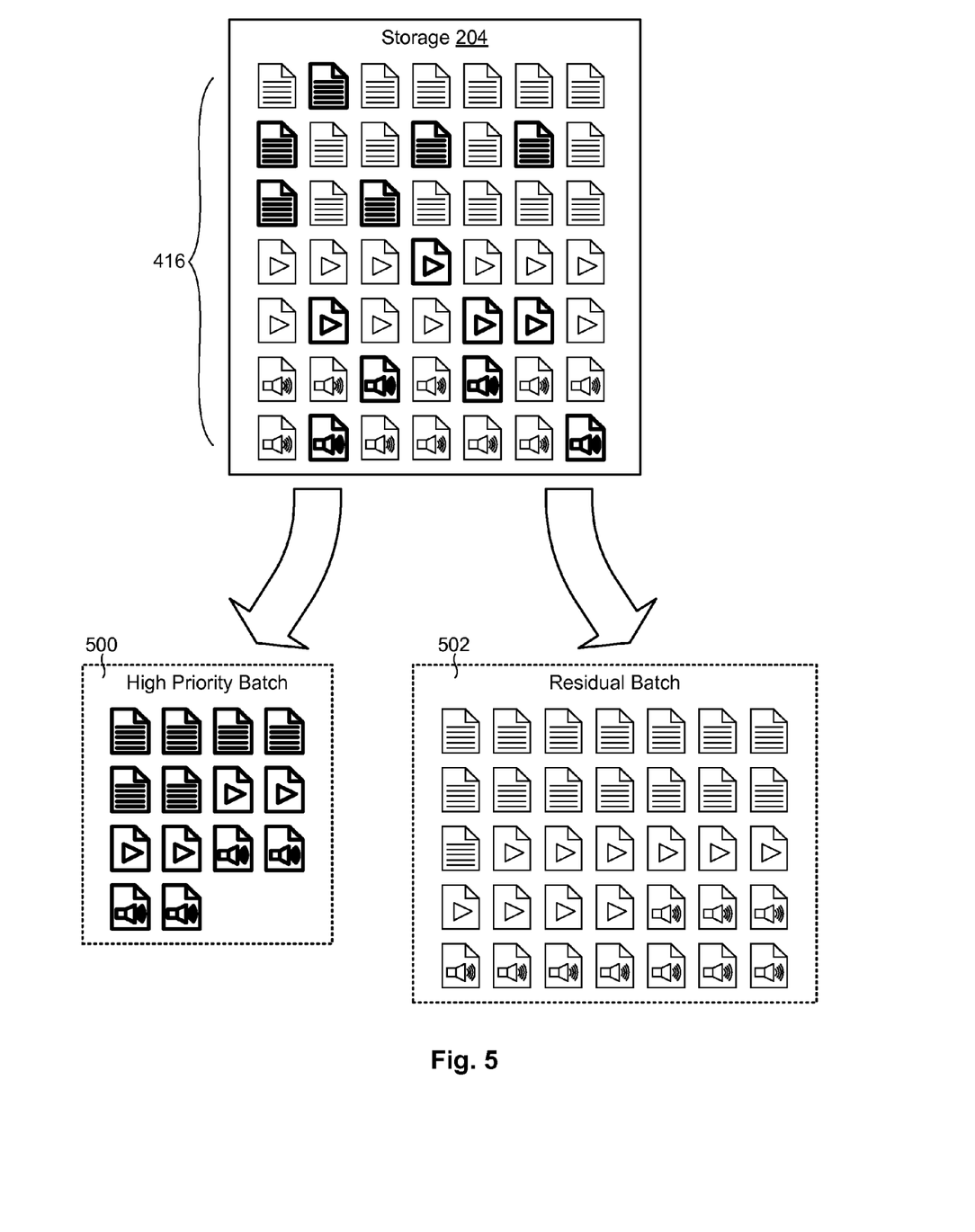
FIG. 5 is a high-level block diagram showing sorting of files into a high priority batch and a residual batch.

Using the metadata 402, the priority scanning module 400 may determine which files 416 were updated since a determined vulnerability date. In the illustrated example, the files 416 in bold represent files that were updated after a determined vulnerability date. These files 416 may be scanned in two separate batches, as shown in FIG. 5. Those files 416 that were updated after the vulnerability date may be scanned in a high priority batch 500. This scan may be performed immediately or with additional urgency. Those files 416 that were updated prior to the vulnerability date may be scanned in a residual (or low priority) batch 502. This scan may be performed during off-peak or lower priority periods to minimize I/O performance degradation. By limiting scanning to those files 416 most vulnerable to a virus, the priority scanning module 400 advantageously focuses virus scanning resources where they are needed. This ideally improves system availability and reduces I/O performance degradation.

The priority scanning module 400 may be configured to operate on data of different granularities. For example, in one embodiment, the priority scanning module 400 may scan complete files 416 for viruses. Alternatively, the priority scanning module 400 may scan sub-files 418 for viruses to improve efficiency. For example, if only a part 418 or parts 418 of a file 416 have been updated since a determined vulnerability date, the priority scanning module 400 may be configured to scan only those parts 418 that have been updated. Sub-files 418 that have not been updated may be scanned during an off-peak or lower priority period. This may significantly improve performance particularly with large files such as video files or medical images. In such embodiments, metadata 402 may be maintained at the sub-file level instead of or in addition to the complete file level.

Figure 6:
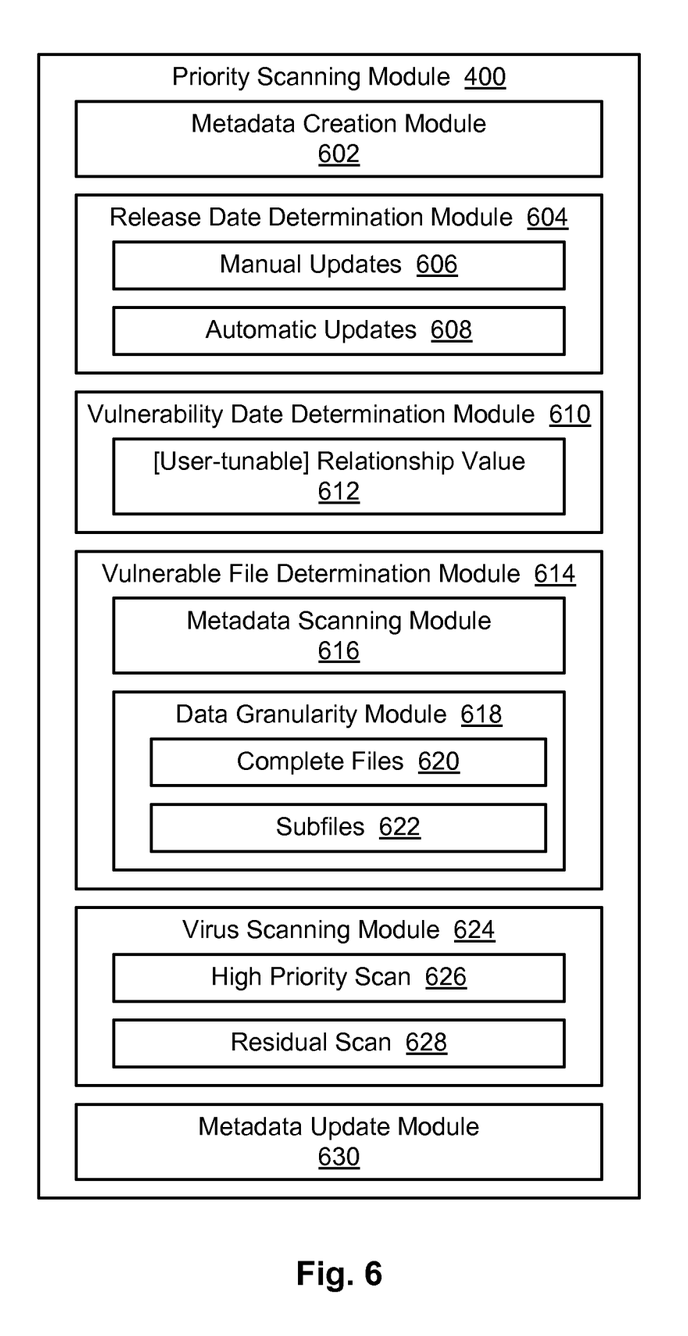
FIG. 6 is a high-level block diagram showing various sub-modules within the priority scanning module.

Referring to FIG. 6, various sub-modules that may be included in a priority scanning module 400 in accordance with the invention are illustrated. As shown, in certain embodiments, the priority scanning module 400 includes one or more of a metadata creation module 602, release date determination module 604, vulnerability date determination module 610, vulnerable file determination module 614, virus scanning module 624, and metadata update module 630.

The metadata creation module 602 may be configured to create metadata 402 for files on a storage system 110. For example, when the priority scanning module 400 is initially installed on a storage system 110 or other machine, metadata 402 used by the priority scanning module 400 may not be present. The metadata creation module 602 may create metadata 402 for the files 416 to enable the priority scanning module 400 to quickly and accurately locate files updated prior to and after a determined vulnerability date. The metadata 402 may also, in certain embodiments, be used to record virus scanning history information associated with the files 416.

The release date determination module 604 may be used to determine a release date associated with a virus. In certain embodiments, the release date determination module 604 accomplishes this using manual updates 606. For example, the release date determination module 604 may enable a user to manually enter a release date associated with a virus. In other embodiments, the release date determination module 604 determines a release date using automatic updates 608. For example, the release date determination module 604 may receive notifications from antivirus software, an email, a web service, or other hardware or software when a new virus definition becomes available.

Once a release date is known, the vulnerability date determination module 610 may determine a vulnerability date associated with the release date. As previously mentioned, the vulnerability date may in certain embodiments be the release date. In other embodiments, the vulnerability date is established some amount of time before or after the release date. In certain embodiments, a relationship value 612, such as a user-tunable relationship value 612, may designate the relationship between the vulnerability date and the release date, such as the time before or after the release date.

Once the vulnerability date is determined, the vulnerable file determination module 614 may determine files that were updated since the vulnerability date. In certain embodiments, a metadata scanning module 616 may accomplish this by scanning the metadata 402 previously described. A data granularity module 618 may, in certain embodiments, search for data at different levels of granularity. For example, the data granularity module 618 may search for complete files 620 that that have been updated since the vulnerability date. Alternatively, or additionally, the data granularity module 618 may search for subfiles 622 that have been updated since the vulnerability date. In certain embodiments, a user may designate the level of granularity.

Once files 416 updated after the vulnerability date have been identified, the virus scanning module 424 may scan the files 416 for viruses. In certain embodiments, the files 416 may be sorted into a high priority scan 626 and a residual scan 628. The residual scan 628 may, in certain embodiments, include all files 416 not scanned in the high priority scan 626. In certain embodiments, the files 416 will be scanned for a virus or viruses associated with the release date. In other embodiments, the files 416 will be scanned for all known viruses or some subset of viruses. The virus scanning module 424 may either scan the files 416 itself or call other functionality or modules to perform the scanning. For example, the virus scanning module 424 may call an antivirus server 106 or other machine or software to perform the scan. In certain embodiments, this may include providing information such as which files to include in the high priority scan 626 and/or the residual scan 628, times to performs the scans, or the like.

Once the files 416 have been scanned, a metadata update module 630 may update metadata 402 associated with the files 416. This may include, for example, updating one or more of the virus identifier 408, virus release date 410, and virus scan date 412 previously discussed.

Figure 7:
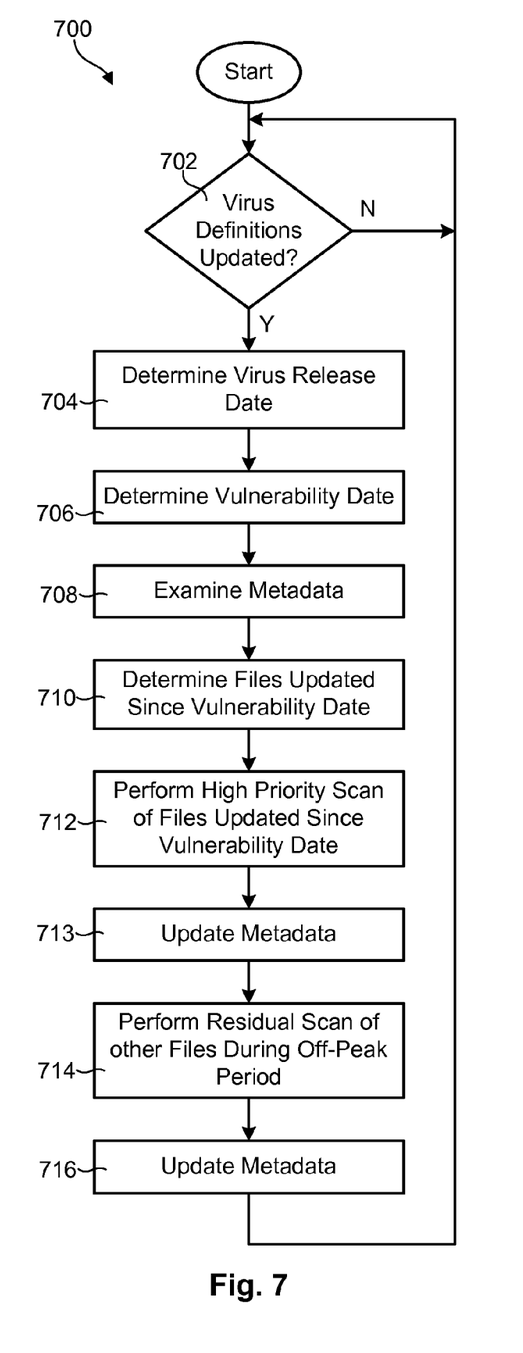
FIG. 7 is a flow chart showing one embodiment of a method in accordance with the invention.

Referring to FIG. 7, one embodiment of a method 700 for more efficiently scanning data for viruses is illustrated. Such a method 700 may, in certain embodiments, be implemented by the priority scanning module 400 previously discussed. As shown, the method 700 initially begins by determining 702 whether one or more virus definitions have been updated. If the virus definitions have been updated, the method 700 determines 704 a release date associated with a virus in the virus definitions. Based on this release date, the method 700 determines 706 a vulnerability date. The method 700 then examines 708 metadata 402 for files 416 on a storage system 110 and, using the metadata 402, determines 710 which files 416 have been updated since the vulnerability date. The method 700 then performs 712, in a first batch, a high-priority scan of files 416 updated since the vulnerability date either by performing the scan or instructing another entity (e.g., an antivirus server or product) to perform the scan. This scan may be performed immediately or promptly as urgency requires. Once the virus scan of the first batch has been performed, the method 700 updates 713 metadata 402 associated with the scanned files 416. The method 700 then performs 714, in a second batch, a residual scan of files 416 not scanned in the high-priority scan. This scan may be performed during off-peak or lower priority periods. Once the virus scan of the second batch has been performed, the method 700 updates 716 metadata 402 associated with the scanned files 416.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for more efficiently scanning files for viruses, the method comprising:
   determining a release date associated with a virus;
   determining a vulnerability date that is a specified amount of time before or after the release date;
   enabling a user to adjust the amount of time by modifying a user-tunable relationship value that designates a relationship between the vulnerability date and the release date;
   dividing, by at least one processor, files stored on a storage system into a first set of files and a second set of files, wherein the first set comprises files that have been updated since the vulnerability date, and the second set comprises files that have not been updated since the vulnerability date;
   immediately scanning, by the at least one processor, the first set of files for the virus;
   delaying, by the at least one processor, scanning of the second set of files for the virus until an off-peak period of I/O to the storage system; and
   scanning, by the at least one processor, the second set of files for the virus during the off-peak period.

2. The method of claim 1, further comprising determining the release date from an antivirus software product.

3. The method of claim 1, wherein dividing the files comprises examining metadata storing update dates for the first and second sets of files.

4. The method of claim 1, wherein the first and second sets of files comprise at least one of complete files, subfiles, and combinations of complete files and subfiles.

5. The method of claim 3, further comprising, after scanning the first and second sets of files, updating the metadata to include at least one of a virus identifier associated with the virus, the release date associated with the virus, and a date the first and second sets of files were scanned for the virus.

6. A computer program product to more efficiently scan files for viruses, the computer program product comprising a non-transitory computer-readable storage medium having computer-usable program code embodied therein, the computer-usable program code comprising:
   computer-usable program code to determine a release date associated with a virus;
   computer-usable program code to determine a vulnerability date that is a specified amount of time before or after the release date;
   computer-usable program code to enable a user to adjust the amount of time by modifying a user-tunable relationship value that designates a relationship between the vulnerability date and the release date;
   computer-usable program code to divide files stored on a storage system into a first set of files and a second set of files, wherein the first set comprises files that have been updated since the vulnerability date, and the second set comprises files that have not been updated since the vulnerability date;

computer-usable program code to immediately scan the first set of files for the virus;

computer-usable program code to delay scanning of the second set of files for the virus until an off-peak period of I/O to the storage system; and computer-usable program code to scan the second set of files for the virus during the off-peak period.

7. The computer program product of claim 6, further comprising computer-usable program code to determine the release date from an antivirus software product.

8. The computer program product of claim 6, wherein dividing the files comprises examining metadata storing update dates for the first and second sets of files.

9. The computer program product of claim 6, wherein the first and second sets of files comprise at least one of complete files, subfiles, and combinations of complete files and subfiles.

10. The computer program product of claim 8, further comprising computer-usable program code to, after scanning the first and second sets of files, update the metadata to include at least one of a virus identifier associated with the virus, the release date associated with the virus, and a date the first and second sets of files were scanned for the virus.

11. A system to more efficiently scan files for viruses, the system comprising:

at least one processor;

at least one memory device operably coupled to the at least one processor and storing instructions for execution on the at least one processor, the instructions causing the at least one processor to:

determine a release date associated with a virus;

determine a vulnerability date that is a specified amount of time before or after the release date;

enable a user to adjust the amount of time by modifying a user-tunable relationship value that designates a relationship between the vulnerability date and the release date;

divide files stored on a storage system into a first set of files and a second set of files, wherein the first set comprises files that have been updated since the vulnerability date, and the second set comprises files that have not been updated since the vulnerability date;

immediately scan the first set of files for the virus;

delay scanning of the second set of files for the virus until an off-peak period of I/O to the storage system; and scan the second set of files for the virus during the off-peak period.

12. The system of claim 11, wherein the instructions further cause the at least one processor to determine the release date from an antivirus software product.

13. The system of claim 11, wherein dividing the files comprises examining metadata storing update dates for the first and second sets of files.

14. The system of claim 13, wherein the instructions further cause the at least one processor to, after scanning the first and second sets of files, update the metadata to include at least one of a virus identifier associated with the virus, the release date associated with the virus, and a date the first and second sets of files were scanned for the virus.

* * * * *